United States Patent [19]
Tomioka et al.

[11] Patent Number: 5,507,527
[45] Date of Patent: Apr. 16, 1996

[54] TWO DIMENSIONAL CODE FOR PROCESSING DATA

[76] Inventors: Makoto Tomioka, 2-3-23 Soya, Ichikawa; Masayuki Matsuda, 1-2-13 Hiyoshi-cho, Kokubuji, both of Japan

[21] Appl. No.: 190,447

[22] Filed: Feb. 2, 1994

[51] Int. Cl.⁶ .......................... G06K 19/00; G06K 7/10
[52] U.S. Cl. .......................... 283/93; 235/494; 250/568
[58] Field of Search .......................... 283/93, 114, 117; 235/494; 250/566, 568

[56] References Cited

U.S. PATENT DOCUMENTS

| | | | |
|---|---|---|---|
| 3,977,007 | 8/1976 | Berry et al. | 283/93 X |
| 5,414,250 | 5/1995 | Swartz et al. | 235/467 X |

FOREIGN PATENT DOCUMENTS

| | | | |
|---|---|---|---|
| 64-44161 | 2/1989 | Japan | 283/93 |
| 2-027496 | 1/1990 | Japan | 283/93 |
| 5-114039 | 5/1993 | Japan | 283/93 |
| 5-258355 | 10/1993 | Japan | 283/93 |
| 6-028510 | 2/1994 | Japan | 283/93 |

*Primary Examiner*—Frances Han
*Attorney, Agent, or Firm*—Browdy and Neimark

[57] ABSTRACT

A system for reading two-dimensional code marks on an article includes a camera for imaging the marks and signal processing means coupled to the camera for processing information contained in the marks. The article bears code marks in a fixed-size marking zone on the article surface. Each of the code marks has a pattern of light and dark areas. The code marks are arranged in a matrix patterned unit block; the matrix may be a single row or column as well as rectangular or truncated rectangular. The unit block includes at least one position code which in turn includes code marks denoting an address code, a start code, an end code, and a line feed code. The code marks are preferably each a block of four squares, with each square being bisected by a respective diagonal line to form two triangles. Each triangle in a square may be differently colored (light or dark).

13 Claims, 8 Drawing Sheets

| | code | start code | address code | line change code | line head code | page change code | page head code | end code |
|---|---|---|---|---|---|---|---|---|
| dark | | 5 | 2 | 3 | 3 | 6 | 6 | 5 |
| clear | | 3 | 6 | 5 | 5 | 2 | 2 | 3 |

| code | start code | address code | line change code | line head code | page change code | page head code | end code |
|---|---|---|---|---|---|---|---|
| dark | 5 | 2 | 3 | 3 | 6 | 6 | 5 |
| clear | 3 | 6 | 5 | 5 | 2 | 2 | 3 |

FIG. 9

| | 4 bit | 8 bit | 16 bit | 32 bit | 64 bit |
|---|---|---|---|---|---|
| dark | 5 | 5 | 5 | 5 | 5 |
| clear | 3 | 3 | 3 | 3 | 3 |

TWO DIMENSIONAL CODE FOR PROCESSING DATA

FIELD OF THE INVENTION

The technology herein disclosed belongs to the technological field which deals with code systems as used in POS (Point of Sale) systems or FA (factory automation) systems for stock management.

DESCRIPTION OF THE PRIOR ART

As is well known, our society owes for its prosperity much to highly advanced industry. Civil society as well as industrial society is supported by advanced science and technology. Today's society is supported by information rather that materials or energy, and highly advanced computer-oriented information processing systems spread into manufacturing, distribution, and society in general. Further development of these systems is demanded. Research and development as well as practical use is gaining momentum.

Production, circulation (distribution), and transportation of products have become information-oriented and have grown up to networks.

In product circulation systems, which affect civil life directly, the so called POS system has been commonly used to secure a stable supply and safe consumption so that information codes are used in various places such as supermarkets and department stores to the great benefit of social life.

Thus, code systems, as seen for example in so-called bar codes, allow us to process data with accuracy and speed surpassing human ability. These systems have been used not only for the management of product circulation (distribution), or stockage (inventory), but also in the production management as in FA systems.

As more and more research and development have been done on various types of automatic reading and managing systems for the man-machine interface, in which binary code data are scanned by means of an optical scanner and processed by a computer, many drawbacks have been found in the widely used bar code systems.

Bar code data provided by one-dimensional bar marks is limited in data volume, even it is in the form of multi-line marks written on a two dimensional plane. It also requires very precise printing techniques, which leads to a higher cost. It also limits the area where the bar mark is applied. As face sensing (i.e., two-dimensional imaging) is not available, the two dimensional bar code system is not employed in FA systems. Although JAN (Japanese Article Number) code is an automatic reading technique, it has hardly been introduced in production systems.

As compared with the one dimensional bar code system which comprise bars combined with spaces therebetween, two-dimensional code systems have the advantages of direct input capability by means of face-sensing with CCD cameras, and connectability with a data processing computer. Therefore, the two dimensional systems draw more and more attention: for example, inventions such as in U.S. Pat. No. 4,939,354 and UKP 1,249,545 and the Japanese Patent Publication 2-12579, Patent Publication before examination 57-191788, Patent Publication 2-268382, and Patent Publication 2-268383. The character display system with square matrix or checkerboard-pattern codes proposed by the same (i.e., present) inventor, so called CALRA code system, has been put to practical use.

Other two dimensional matrix code systems, now in use at low cost, have been proposed.

The matrix type of two dimensional code system heretofore developed aims mainly at processing a larger quantity of data by improving density. However, this code is not suited for automatic reading and managing of information on images as a whole, nor for optimum processing of unit images by means of, for instance, CCD cameras; that is, the system has the drawback that there is no clear differentiation between image data processing and whole image processing. Therefore, data as scanned at particular spots are not processed in relation with the whole image by merely enlarging the spotted images. The system also has the drawback that it lacks an indexing function (such as additional functional data) and that check digit function must be provided.

Therefore, such a matrix type of two dimensional code has not been put into a wide range of practical use for introducing the FA systems nor has it been standardized, because of the drawbacks mentioned above.

SUMMARY OF THE INVENTION

The objective of present invention is on one hand to overcome the drawbacks which the above-mentioned two dimensional matrix code has and, on the other hand, to overcome the drawbacks of one-dimensional bar codes of the prior art; enabling two-dimensional sensing, scanning matrix data that are arranged in rows and lines (columns) by using the automatic recognition techniques hitherto developed, regardless of the positions of works (workpieces) to be conveyed or to be worked, or of the image position of either the whole or a spot; providing a check digit function; handling a large volume of data; providing a functional code for handling data from external data sources, thus making available an ultimate interface language; and multi-language potential whereby a two-dimensional code sheet can be used in data processing technology used by various industries.

In order to achieve these objectives, the present invention relates to a two-dimensional code sheet which is to be placed on a surface of a workpiece. In a column of the code sheet, unit blocks of codes of fixed size are arranged in rows, lines, or in matrices, written by thermoprinting means. Each unit block has several code marks, such as a black (or negative) pattern, a white (or positive) pattern, or a mixed pattern, regularly arranged in a mark sheet as printed on a projected mark. A unit block may be comprised of marks in a line or in a row.

The code mark of a unit block includes a start code at its top, an end code and a line feed code at its end, and other data codes in between. Between the lines can be inserted functional codes taken from another data list, i.e. codes for bit number, character code, alphabet, Chinese characters, mathematical equations, control data, or data communication codes.

As an automatic sensing means for the unit block, a CCD camera is used for scanning, whereby the position of the mark scanned in the matrix is known by the position code regardless of whether the entire matrix is scanned or part of the matrix is scanned. Scanning from the start code is thus enabled.

DETAILED DESCRIPTION OF THE PREFERRED EMBODIMENTS

An embodiment of the present invention is described below with reference to the FIGS. 1 to 3.

Figure 1:
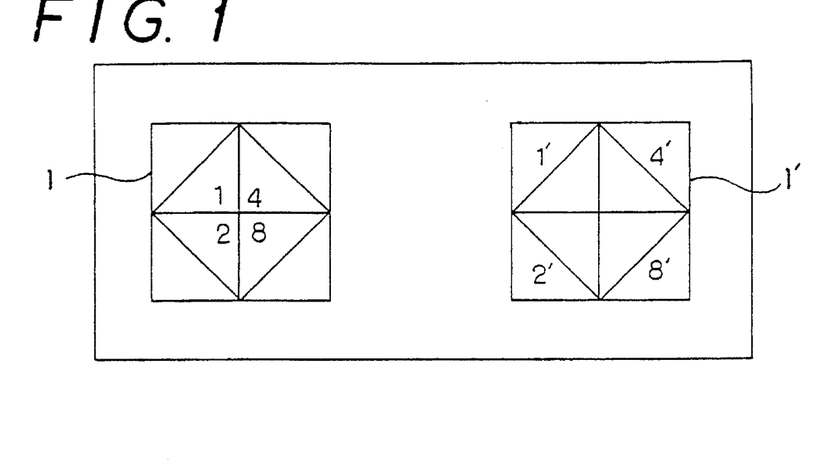
FIG. 1 is a plan view of an example of code mark according to the invention.

The embodiment shown in FIG. 1 is an example of a mark sheet-type code mark which is the core of present invention.

The mark consists of four squares, each of which is divided into two triangles, and these triangles are made dark (negative area) or blank (positive area) by highly sensitive (precise) thermoprinting, thus forming a binary code mark capable of expressing numerals 1, 2, 4, 8 or a geometric series.

Figure 2:
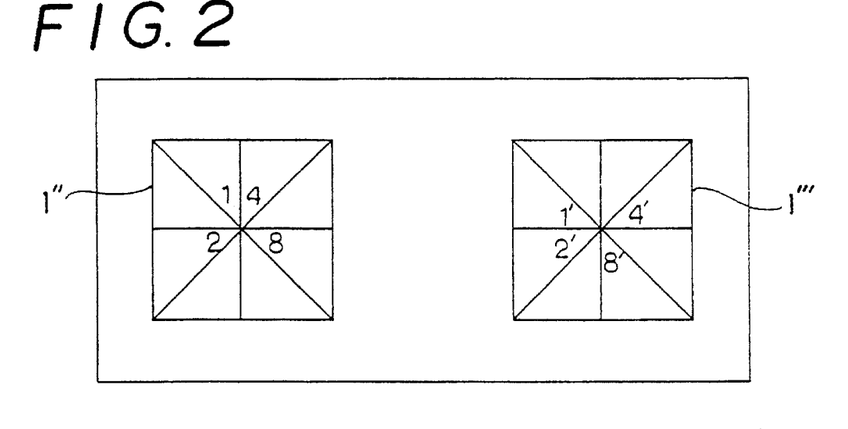
FIG. 2 is a plan view of another embodiment.

As shown in FIG. 2, other diagonal lines may be drawn to make another embodiment 1", 1'".

Figure 3:
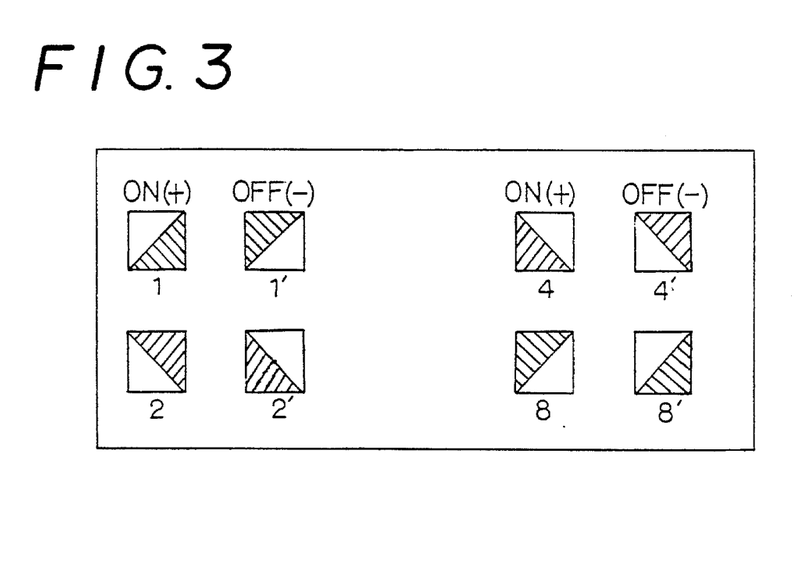
FIG. 3 is a plan view of code marks having different positive-negative patterns.

As shown in FIG. 3, various combinations of positive and negative areas are possible for an on-or-off pattern.

In another code type, printed or dark areas may be positive (or negative) and white areas negative (or positive). Which area is designated as positive or negative can be selected according to the benefit of users.

Figure 4:
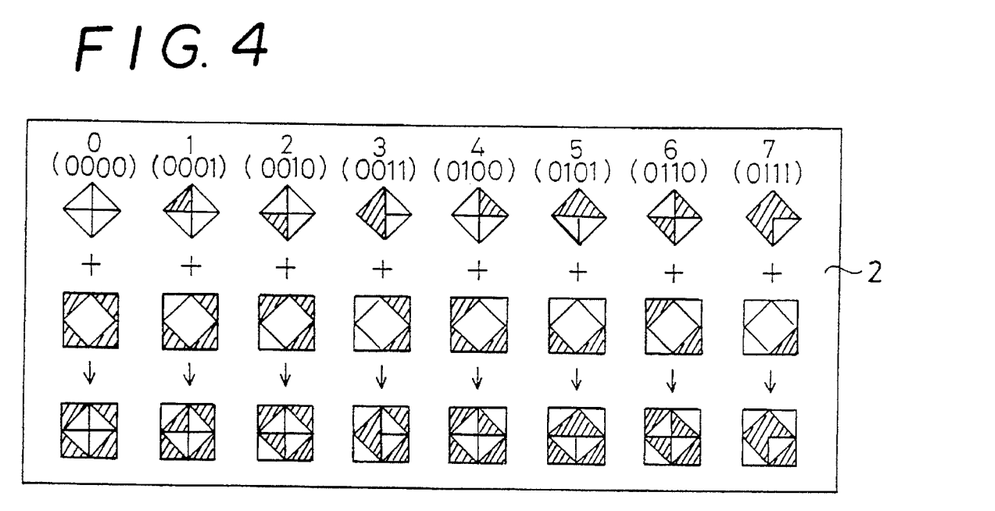
FIG. 4 is a plan view of the code marks which shows a basic combination mode.
Figure 5:
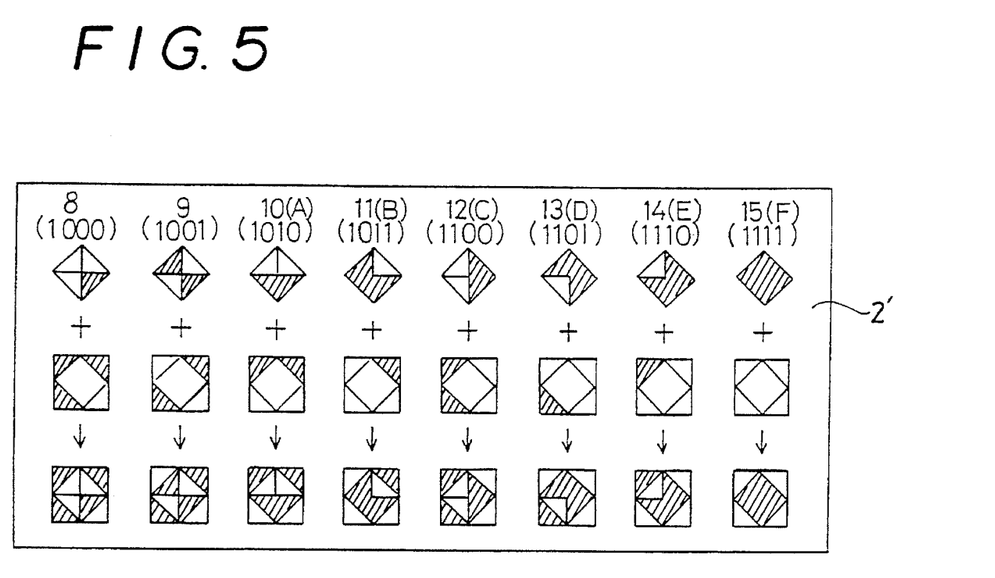
FIG. 5 is plan view of code marks continued from FIG. 4.
Figure 6:
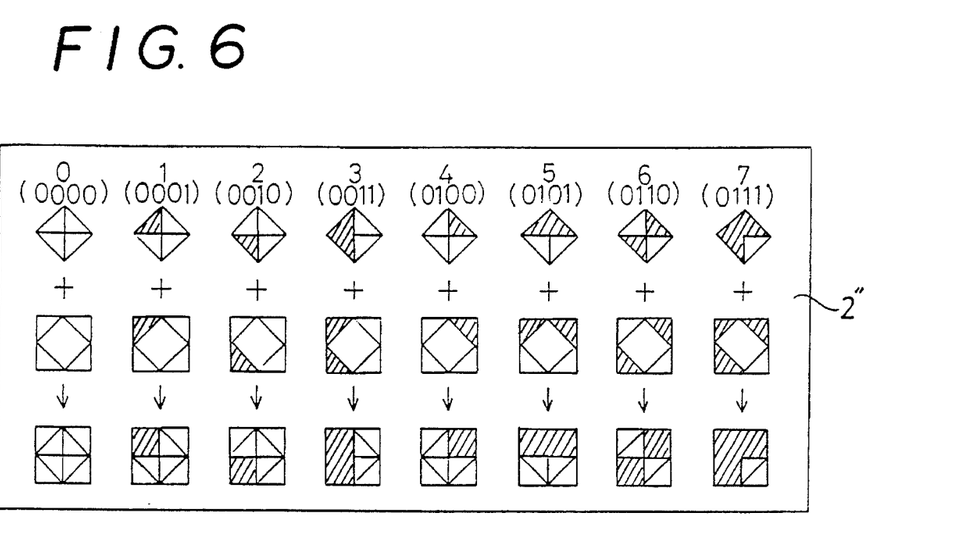
FIG. 6 shows another embodiment of code marks continued from FIGS 4.
Figure 7:
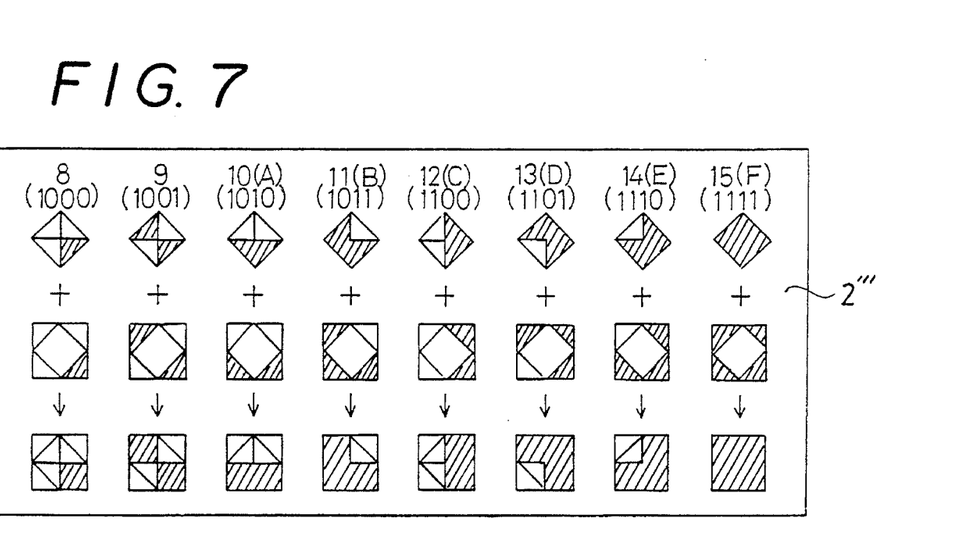
FIG. 7 shows another embodiment as shown in FIG. 5.

As described above, a positive-negative code mark corresponds to a binary code, and is shown as a matrix in FIGS. 4 and 5, in which the combinations of upper and lower marks are shown at the bottom. FIGS. 5, 6 and 7 show similar combinations but upper positives and lower negatives are shown in the same color (i.e., shade).

The mark at the bottom left of FIG. 6 and the one at bottom right (in FIG. 7) are all white and all black respectively. The former is used with four corners in black, the latter in white at central portion.

It goes without saying that the data code can express matrix elements, such as character marks, designs, alphabets, Greek characters, German characters, Chinese characters, Hiragana, Katakana (Japanese alphabet), Korean characters, and Arabic numerals, as well as braille, stenographic characters, Morse code, bar code, OCR, or sheet marks. These data codes use the code mark proposed in the present invention.

Furthermore, the peripheral positive-negative parts can be combined with the core area in several angular positions. The peripheral portion as well as the core portion has four display areas, which can be used as check digit codes; therefore no check digits are required.

The discussion above is illustrated in Table 1.

The display codes of the present invention are arranged in a matrix including single lined codes, to form a unit block, of which Table 2 shows a systematic classification.

Figure 8:
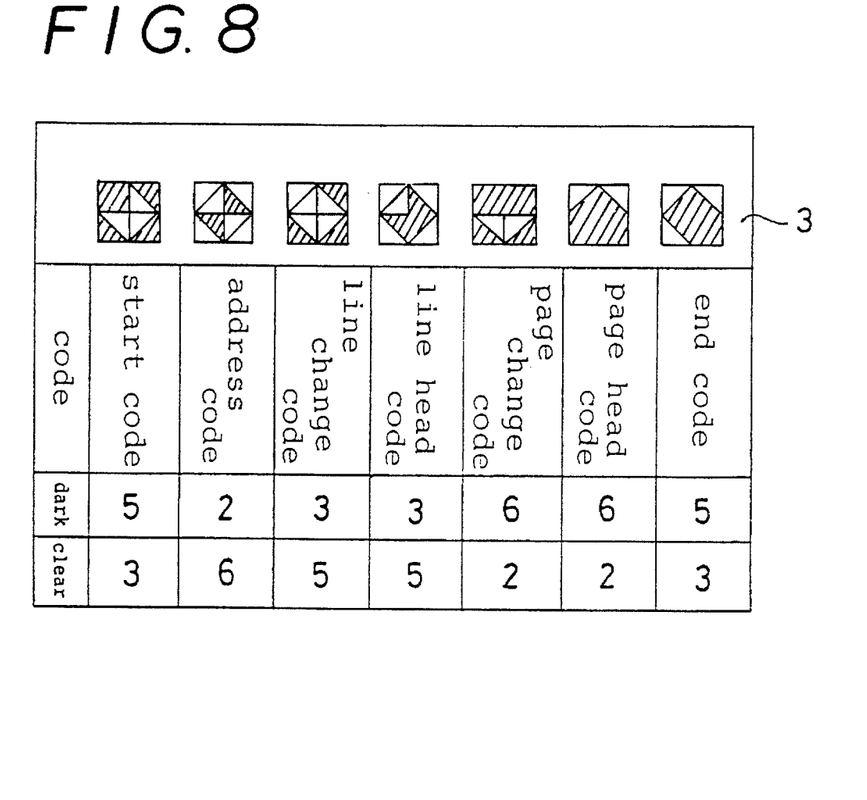
FIG. 8 shows various positive codes.

In case of partial sensing by a sensing device such as a CCD camera, the unit blocks contained in the area being scanned are not used to find out the location of the matrix in relation to the whole image. For this purpose, various prepared codes are used, such as: an address code for indicating an address necessary for heading, retrieving or ending of information; a start code for indicating the starting location of the matrix; a first page code for indicating the first page or first section of a plurality of pages or sections of display code; a line feed code placed at the end of a line for indicating "feed the line"; an end code for indicating the end or termination of the matrix display codes; an indication code placed at the head of a matrix; a page code for indicating the page (in case the data codes are displayed on several pages); and a territory code placed on the marginal area of a code display for indicating the area. These codes are expressed in positive-negative patterns (3) as shown in FIG. 8.

The positive-negative patterns are not restricted to the embodiment shown above, but other patterns (e.g. reversed combination of positive and negative area) are possible.

In order to direct the kind of order or structure, a group of rule codes are interpolated into the code, such as: a bit structure indication code for indicating bit numbers (e.g., 4, 8, 16, 32, 64) or block number; a protect code for directing translation of data code through rotation, combination, or transfer of the data to obtain accuracy of information; a language code for designating the kind of languages used (such as alphabet, Chinese characters, Kana letters, numerals, marks, signs or machine language such as programming language or assembly language, or special languages such as braille, stenography, or the Morse code); a command code for directing functions such as insertion or deletion; a character code for directing a functional formula, translation, grammar, communication language or language shift; a shift code for directing interpolation of tables, functions, formulas, or equations; an address volume code for indicating the total number of address volume codes to be placed in a matrix; a page volume code for indicating the data volume in terms of page or volume when the data extends to several pages or sections; a data sheet retrieval code for directing rules for retrieving a data sheet numbers or data sheet addresses; an interrupt code placed before the rule code to change the rule code into another code; an interrupt cancel code to cancel the rule code and return to the former rule code; and an original order code for a specific purpose such as postal code or carriage numbers.

Figure 9:
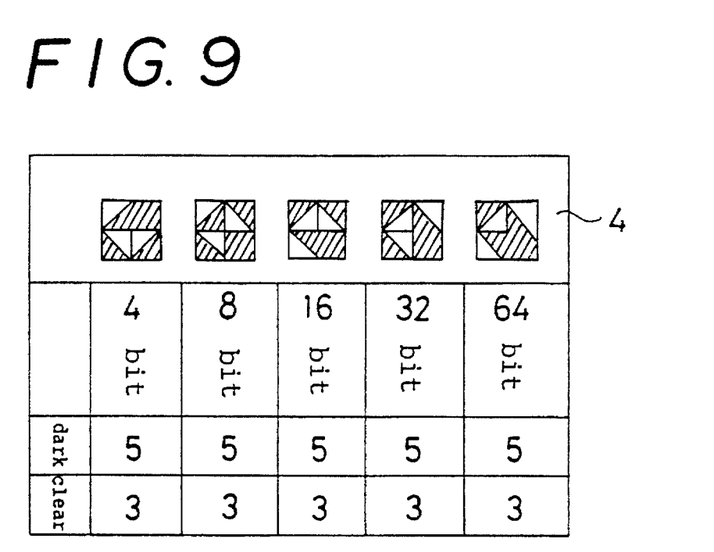
FIG. 9 shows various rule codes.

As an example of these rules, a bit code is shown in FIG. 9 placed in a desired position of a matrix.

In order to build up data, bit codes (such as basic characters, patterns marks, or codes) are used. These data codes include character codes for numerals, names of countries, or racial characters; machine codes such as bar code, OCR patterns for a machine-readable code (exp JIS-X0201), or Kanji codes; mark codes assigned to each multi-bit figure or character for processing data; special language codes used in braille, stenography or Morse code; and other original codes which may be proposed after the present invention.

Figure 10:
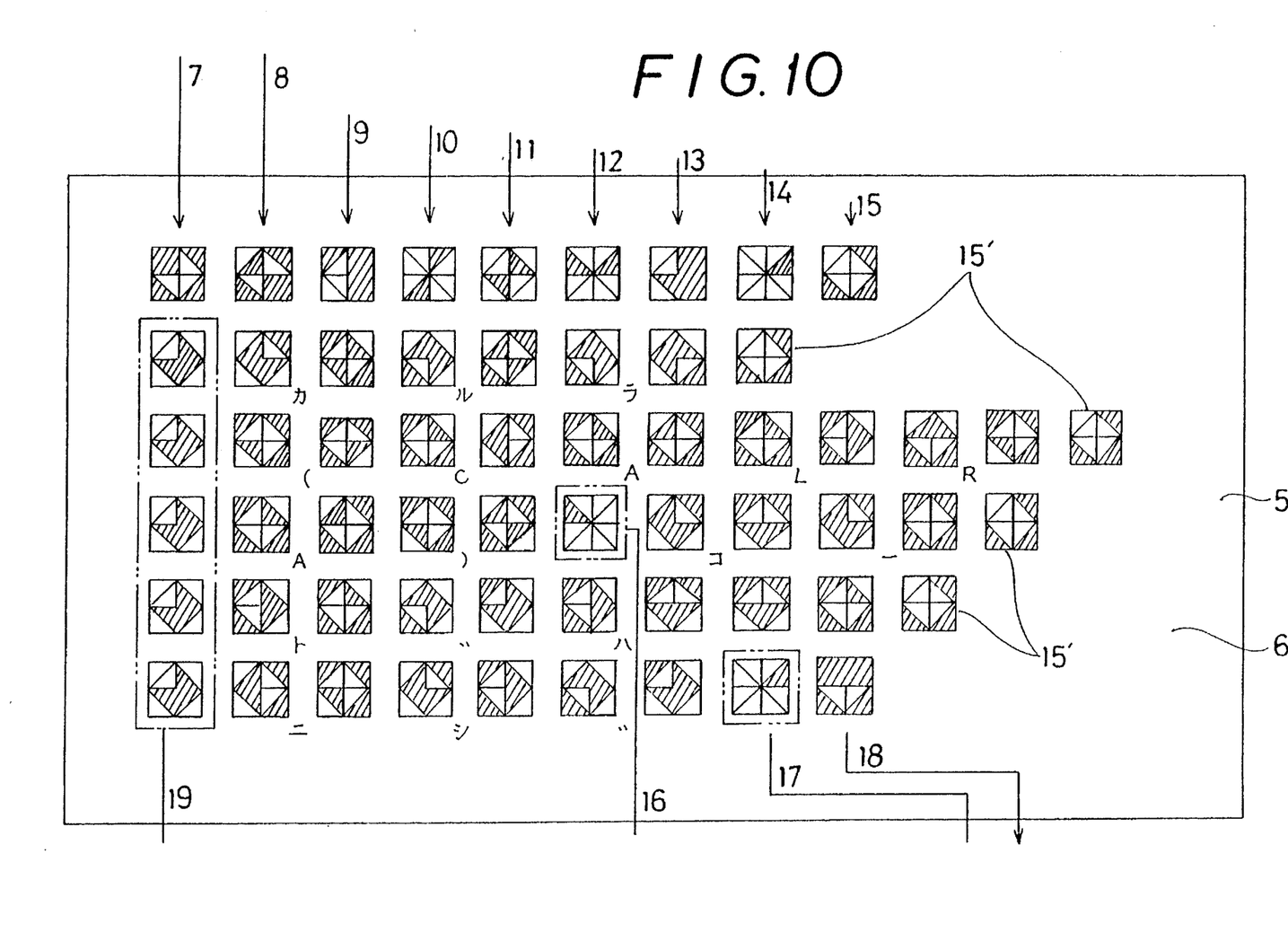
FIG. 10 shows the first page of a matrix of code.
Figure 11:
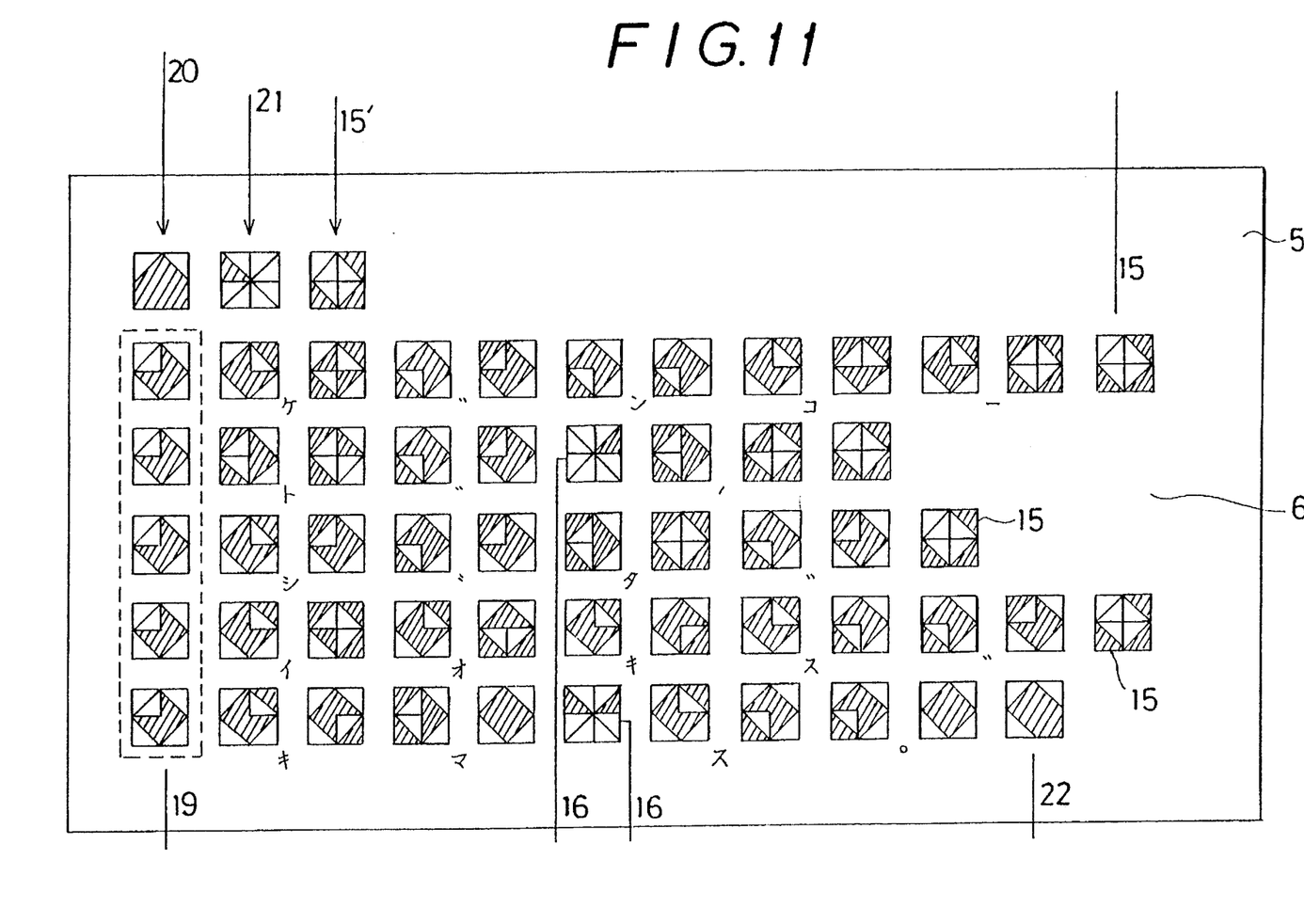
FIG. 11 shows the second page of matrix code.

Referring now FIGS. 10 and 11, an ordinary embodiment using the group codes discussed above will be described. FIGS. 10 and 11 represent a Japanese expression meaning "CALRA code will found the era of 2 dimensional code". Two sheets of code marks (two pages) of matrix display type are shown in a series of codes in the zone 6, 6' of a unit block.

On the first sheet 5 are: a start code 7 (a position code as well); a bit type indication code 8 (in this embodiment, 8-bit); a language code 9; a language number code 10; an address code 11; an address volume code 12 (in this embodiment, 3); a page code 15; and a page volume code. At the end of each line is a line feed code 15', at the head of each line a head code 19, and at a middle point, an address code 16.

At the end of the series of code of the first code sheet 5 are placed a code 17 indicating "to be continued on the next page" and a page feed code 18.

On the next page, i.e., the second code sheet 5', the following codes are placed: a head code 20; a line feed code 15' next to a code 21; a line head code 19 at the next line; and, at the line end, an end code 22.

It is obvious that the present invention is not restricted to the embodiment shown above. In other embodiments of the invention, it is possible to use the snake code as data code, or to lay up lines of code like building blocks.

Figure 12:
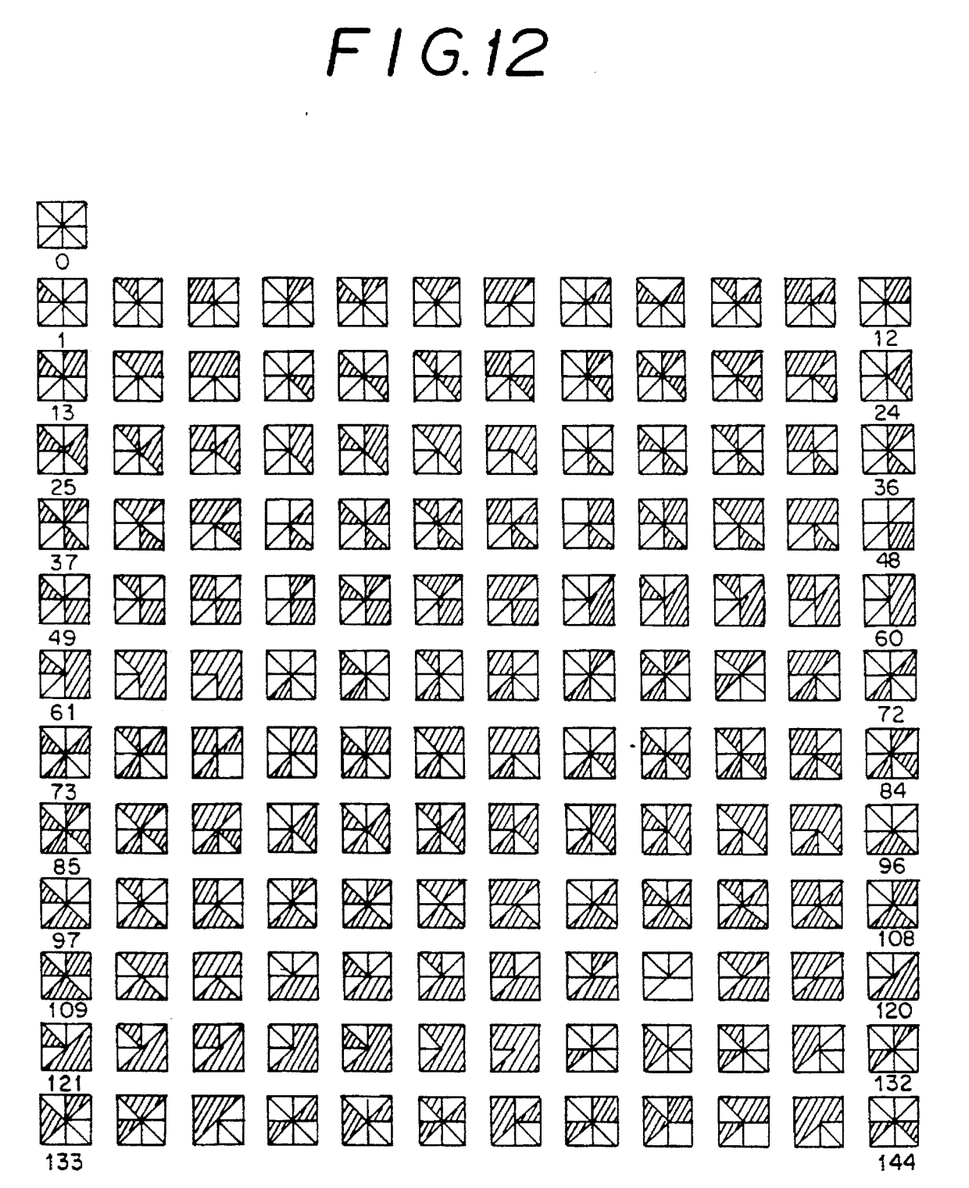
FIGS. 12 and 13 show another embodiment of matrix type code arrangement.
Figure 13:
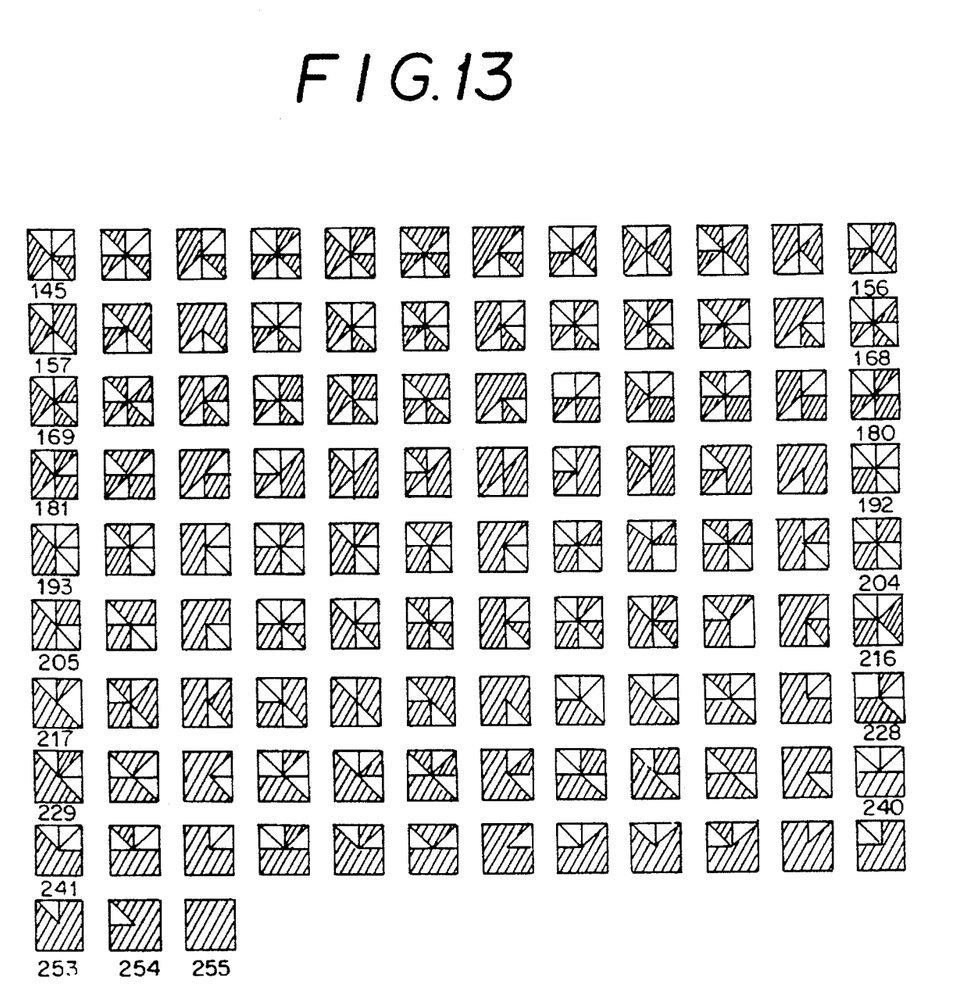

It is obvious that the feature as shown in FIGS. 12 and 13 can be proposed by changing the design with respect to the positive-negative patterns.

The matrix type two dimensional code according to the present invention is applicable not only to the conventional POS system, but also to an FA system. It requires no high precision printing technique, is capable of covering misreading of worn out codes (resulting from long time use) by neighboring normal codes, has a high reading accuracy, and has an intelligent function such that automatic sensing is possible in regard to quality, kinds, or destinations of goods, allowing spot sensing or oblique sensing of goods which are moving on a conveyor.

It is also possible to read functional data from an external source. Because of its check digit function, it realizes efficacious data processing and standardization in an FA system.

By putting at the head or end of each line or row of a matrix-like code arrangement a position code (e.g., address code, start code, end code line feed code, or rule code for directing a conversion to another sheet), multiple data processing of a large quantity of data is possible.

Other advantages of the present invention are that it allows interpolation of data from other sources by inputting data codes corresponding to a rule code, that it permits processing of data from partially sensed codes, and that it allows data to be encoded with high density and accuracy.

The two dimensional code of the present invention is applicable not only to industrial goods or distributed goods but also to information cards, data processing tapes or disks (or floppy disks), thus realizing wide range of use.

In summary, the present invention relates to a multi-purpose two dimensional code which is capable of processing a large quantity of data with high speed and high accuracy.

It employs a plurality of mark sheet type negative and positive codes arranged in a matrix-like arrangement within a mark zone 6 of a sheet 5.

Each code mark makes either a positive type or negative type binary code. Data codes are provided with address code, start code, end code, line feed code, page feed code, and position code in relation to the desired functions. Further, rule codes such as language code and bit number code are provided for a translation code of other data codes.

The data sheet code according to the present invention is capable of displaying multi-dimensional data, of sensing codes data in an optimum position not only for the image as a whole but also for partial image data, and of processing data automatically with high speed and accuracy.

TABLE 1

|  | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| positive(four blocks) | | | | | | | | | | | | | | | | |
| black margin area | null | 1 | 2 | 1,2 | 4 | 1,4 | 2,4 | 1,2,4 | 8 | 1,8 | 2,8 | 1,2,8 | 4,8 | 1,4,8 | 2,4,8 | 1,2,4,8 |
| number of black margins | 0 | 1 | 1 | 2 | 1 | 2 | 2 | 3 | 1 | 2 | 2 | 3 | 2 | 3 | 3 | 4 |
| number of white margin | 4 | 3 | 3 | 2 | 3 | 2 | 2 | 1 | 2 | 2 | 2 | 1 | 2 | 1 | 1 | 0 |
| negative(four blocks) | | | | | | | | | | | | | | | | |
| black margin area | 1,2,4,8 | 2,4,8 | 1,4,8 | 4,8 | 1,2,8 | 2,8 | 1,8 | 8 | 1,2,4 | 2,4 | 1,4 | 4 | 1,2 | 2 | 1 | null |
| number of black margin | 4 | 3 | 3 | 2 | 3 | 2 | 2 | 1 | 3 | 2 | 2 | 1 | 2 | 1 | 1 | 0 |
| number of white margin | 0 | 1 | 1 | 2 | 1 | 2 | 2 | 3 | 1 | 2 | 2 | 3 | 2 | 3 | 3 | 4 |
| entire(other blocks) | | | | | | | | | | | | | | | | |
| number of black margin | 4 | 4 | 4 | 4 | 4 | 4 | 4 | 4 | 4 | 4 | 4 | 4 | 4 | 4 | 4 | 4 |
| number of white margin | 4 | 4 | 4 | 4 | 4 | 4 | 4 | 4 | 4 | 4 | 4 | 4 | 4 | 4 | 4 | 4 |

TABLE 2

Classification and definition of code for data processing systems using matrix type codes

- classification of code
  - position code
    - start code
    - address code
    - line head code
    - line feed code
    - page head code
    - page feed code
    - end code
    - territory code
  - rule code
    - address volume code
    - page volume indication code
    - bit indication code
    - protect indication code
    - language direction code
    - command indication code
    - translation code
    - data sheet search code
    - interrupt direction code
    - interrupt end code
    - original designation code
  - data code
    - character code
    - machine code
    - mark code
    - special language code
    - original code
  - data sheet

SUMMARY

Summary
[Objective]

To propose a multi-purpose two dimensional code sheet which is capable of processing a large quantitiy of data with high speed and high accuracy.

[Structure]

A plurality of mark sheet type negative and positive code are arranged in a matrix-like arrangement within a mark zone 6 of a sheet 5.

Each code mark makes either a positive type or negative type binary code. As data codes are provided with address code, start code, end code, line feed code, page feed code, position code in relation to the desired functions. Further, rule codes such as language code and bit number code is provided for a translation code of other data codes.

[Advantage]

The data sheet code according to the present invention is capable of displaying multi dimensional data, of sensing codes data in an optimum position not only for image as a whole but for partial image data, and of processing data automatically with high speed and accuracy.

We claim:

1. A device including code markings for automatic data reading of a surface of an article by a camera-computer system, comprising:

a fixed-size marking zone on the surface of the article;

code marks deployed in a unit block matrix pattern within the zone, the pattern including lines of code marks in two perpendicular directions, the code marks being non-contiguous within the zone;

each one of the code marks further comprising a pattern of n distinct contiguous triangular areas, the areas selectively being light and dark;

each of the code marks having $2^n$ distinct configurations of light and dark, and wherein the camera-computer system may assign corresponding particular meanings to each one of the configurations, and the meanings may include data and non-data positional messages.

2. In a system for reading two-dimensional code marks on an article including a camera for imaging the marks, signal processing means coupled to the camera for processing information contained in the marks, and a surface of the article bearing the code marks thereon, wherein the code marks are contained in a fixed-size marking zone of the surface and each of the code marks further comprises a pattern of light and dark areas; the improvement comprising:

the code marks being non-contiguous within the marking zone;

each one of the code marks further comprising a pattern of n distinct contiguous triangular areas, the areas selectively being light and dark;

the code marks being arranged in at least one unit block as a row-column matrix; and rows and columns of the unit block each including at least one position code, the position code further comprising code marks denoting an address code, a start code, an end code, and a line feed code.

3. The system according to claim 2, including a plurality of the position codes, and wherein ones of the plurality are separated by data sequences of generally uniform length.

4. The system according to claim 2, wherein the unit block includes dark areas on a light background.

5. The system according to claim 2, wherein the unit block includes light areas on a dark background.

6. The system according to claim 2 wherein and rows or columns of the unit block each include a rule code.

7. The system according to claim 6, wherein the rule code further comprises a translation code for translating an interpolating code, the interpolating code being not contained in the unit block.

8. The system according to claim 6, wherein the rule code further comprises a function code for directing commands.

9. The system according to claim 6, wherein the rule code further comprises a bit direction code.

10. The system according to claim 6, wherein the rule code further comprises a protect direction code.

11. A device including code marking for automatic data reading of a surface of an article by a camera-computer system, comprising:

a fixed-size marking zone on the surface of the article;

code marks deployed in a unit block matrix pattern within the zone, the pattern including lines of code marks in two perpendicular directions;

each of the code marks further comprising a two-by-two checkerboard pattern of 4 distinct contiguous squares, each one of the squares being divided by one diagonal line extending between opposite square corners, such that 8 distinct contiguous areas are within each of the code marks;

the areas selectively being light and dark;

each of the code marks being individually adapted to 256 distinct configurations of light and dark, whereby the camera-computer system may assign corresponding particular meanings to each one of the configurations, and the meanings may include selectively data and non-data messages of position within the zone.

12. The device according to claim 11, wherein diagonals of each one of the code marks are selectively:

all crossed lines meeting at a center point of the square; and all squared lines meeting at midpoints of sides of the square.

13. The device according to claim 11, wherein diagonals of each one of the code marks are all squared lines meeting at midpoints of sides of the square, and four outer triangles are check digits for four respective adjoining inner triangles.

* * * * *